(12) United States Patent
Kuboniwa

(10) Patent No.: US 8,101,259 B2
(45) Date of Patent: Jan. 24, 2012

(54) COMPOSITE THERMALLY INSULATING MATERIAL

(75) Inventor: Seichii Kuboniwa, Tokyo (JP)

(73) Assignees: MAG Co., Ltd., Tokyo (JP); Saint-Gobain Isover, Courbevoie (FR)

( * ) Notice: Subject to any disclaimer, the term of this patent is extended or adjusted under 35 U.S.C. 154(b) by 440 days.

(21) Appl. No.: 11/995,935

(22) PCT Filed: Jul. 24, 2006

(86) PCT No.: PCT/EP2006/007277
§ 371 (c)(1),
(2), (4) Date: Jan. 22, 2008

(87) PCT Pub. No.: WO2007/009820
PCT Pub. Date: Jan. 25, 2007

(65) Prior Publication Data
US 2008/0124511 A1    May 29, 2008

(30) Foreign Application Priority Data

Jul. 22, 2005  (JP) .................................. 2005-212283

(51) Int. Cl.
*B32B 1/06*    (2006.01)

(52) U.S. Cl. ........................................... 428/69; 428/76
(58) Field of Classification Search ................... 428/69, 428/76, 71; 52/788.1
See application file for complete search history.

(56) References Cited

U.S. PATENT DOCUMENTS

| 2,233,190 A * | 2/1941 | Amorosi ..................... 52/788.1 |
| 4,377,927 A * | 3/1983 | Dyar ........................... 52/407.2 |
| 6,860,082 B1 * | 3/2005 | Yamamoto et al. .......... 52/794.1 |

* cited by examiner

*Primary Examiner* — Alexander Thomas
(74) *Attorney, Agent, or Firm* — Oblon, Spivak, McClelland, Maier & Neustadt, L.L.P.

(57) ABSTRACT

A composite thermally insulating material suitable for use in houses, which can manifest high thermal insulation performance when packed into a restricted cavity between outer and inner walls. The composite is constructed from two sheet-shaped fiber-based thermally insulating materials and a vacuum thermally insulating material incorporated between the fiber-based thermally insulating materials. The region between the fiber-based thermally insulating materials and vacuum thermally insulating material can be secured with adhesive agent.

10 Claims, 2 Drawing Sheets

COMPOSITE THERMALLY INSULATING MATERIAL

BACKGROUND OF THE INVENTION

I. Field of the Invention

The present invention relates to a high-performance composite thermally insulating material comprising a composite of a vacuum thermally insulating material and an ordinary thermally insulating material used, for example, in houses.

II. Description of Related Art

In houses and the like, for the purposes of enhancing the thermal insulation properties of the walls and roof, etc, the usual means employed is either to increase the thickness of the fitted thermally insulating materials or to select a thermally insulating material of still lower thermal conductivity, that is to say better heat insulating performance. However, in the case of the insulation of the walls of houses for example, since the thermally insulating material is used to fill the restricted cavity between the outer and inner walls, there is a limit to the enhancement of the heat insulating performance by increasing the thickness of the thermally insulating material.

Furthermore, with regard to thermally insulating materials with good heat insulating performance, amongst those thermally insulating materials currently employed, in the case of plastic thermally insulating materials it is possible to achieve a level of heat insulation of about 0.02 W/m·K. However, this value is essentially the limit and, in particular, it is insufficient for use in buildings in cold or very hot regions. Hence, in addition to filling the wall cavities with an insulating material, it is necessary to add heat-insulating cladding.

The vacuum thermally insulating materials described in Japanese Patent 3580315 (JP2005220954), WO0185445 or Japanese Patent 3578172 (JP2005180594) are known as high-performance heat insulating materials in other fields. In the case of such vacuum thermally insulating materials, a core material like glass wool is packed inside an outer covering material comprising a plastic film or the like, and by maintaining a vacuum in the core region it is possible to exhibit high thermal insulation. Such materials are used primarily for thermal insulation in freezers and refrigerators, etc.

Vacuum thermally insulating materials have high performance but they are very weak in terms of external impact. Consequently, if the vacuum thermally insulating materials disclosed in aforesaid references were to be converted to use in houses, when subject to impact during transportation or fitment, etc, cracks and pinholes would readily be introduced and the interior vacuum impaired. Moreover, once the degree of vacuum is lowered, the performance drops immediately to that of an ordinary fibre-based thermally insulating material. Consequently, they are difficult to employ for house insulation.

BRIEF SUMMARY OF THE INVENTION

In order to solve the aforesaid problem, the composite thermally insulating material relating to the present invention comprises at least two fibre-based thermally insulating materials of sheet shape between which there is interposed at least one vacuum thermally insulating material the outer shape of which is that of a sheet of dimensions smaller than those of the fibre-based thermally insulating materials, and the fibre-based thermally insulating materials are integrally coupled.

Furthermore, in a preferred embodiment, at the surface of at least one fibre-based thermally insulating materials, lines are drawn corresponding to the outer edges of the vacuum thermally insulating material interposed in the interior.

In the composite thermally insulating material relating to the present invention, the vacuum thermally insulating material which is susceptible to impact is interposed between, and protected by, the sheet-shaped fibre-based thermally insulating materials, so impact during transportation and fitment is mitigated when compared to the handling of the vacuum thermally insulating material by itself, and thus the transportation properties and usability are markedly enhanced. Furthermore, by preventing a lowering in the degree of vacuum by mitigating impact in this way, it is possible to sustain the heat insulating performance. Consequently, at the same thickness as that of conventional fibre-based thermally insulating materials, it is possible to produce a composite thermally insulating material having higher performance, and in a comparison by the method of filling walls of given thickness it is possible to obtain better thermal insulating performance than hitherto.

Moreover, when the vacuum thermally insulating material is interposed between the fibre-based thermally insulating materials, since the vacuum thermally insulating material is stiffer that the surrounding fibre-based thermally insulating materials it is possible to identify the position of said vacuum thermally insulating material to some extent just by pressing from outside or by bending it slightly. However, it may be difficult to know its exact position. Hence, when installing between walls or the like, if, for example, the edges of the composite thermally insulating material are trimmed away on-site to match the required space, there is a fear that the vacuum thermally insulating material will also be cut.

Hence, in one particular embodiment, on the surface of at least one fibre-based thermally insulating material, there is drawn a pattern, such as lines corresponding to the outer edges of the vacuum thermally insulating material sandwiched inside. So it is possible to reliably avoid any such cutting of the vacuum thermally insulating material at the time of putting the insulation material at the appropriate size (hereinafter referred to as "sizing").

In another embodiment, the vacuum thermally insulating material is of a kind composed of a plurality of independent vacuum insulating cells, which may be formed of a plurality of core members disposed at specified intervals and encased within an envelope sealed at each interval. The size of the cells may be chosen according to the needs. One such material is disclosed in JP2004-197935 which is entirely incorporated therein by reference. With such a vacuum insulating material consequences of a cutting are limited to the number of affected cells. It is also possible to draw on the surface of at least on insulating material a pattern which correspond to locations where the cutting is harmless to the vacuum insulation, such as the location of separation between cells, like a seal line.

BRIEF DESCRIPTION OF THE DRAWINGS

Below, embodiments of the present invention are explained based on the appended drawings.

DETAILED DESCRIPTION OF THE INVENTION

Figure 1:
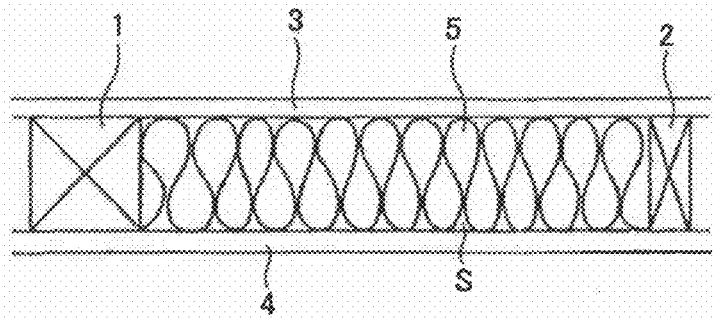
FIG. 1 is a cross-sectional view of a wall filled with thermally insulating material based on a conventional construction method.

In FIG. 1, a cavity (space) S is defined between the faces of pillar 1 and stud 2 by the fitment of outer building material 3 and inner building material 4, and this cavity S is filled with thermally insulating material 5. The thickness of thermally insulating material 5 is restricted by the width of the pillar 1 and stud 2 and, where it is desired to fit more insulating material than this, it has hitherto been necessary to cover the outside of the outer building material 3 with further insulating material.

Figure 2:
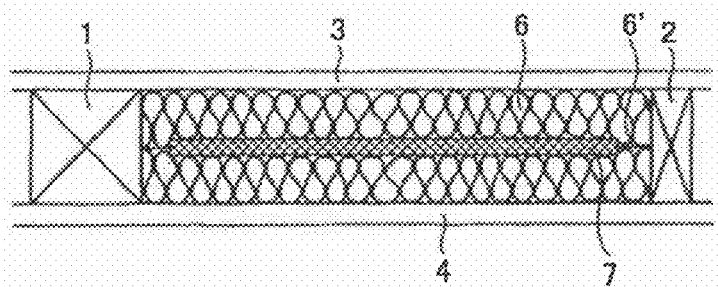
FIG. 2 is a cross-sectional view showing an example where the composite thermally insulating material of the present invention has been employed.

On the other hand, FIG. 2 shows a composite thermally insulating material of the present invention which is constructed from two sheet-shaped fibre-based thermally insulating materials 6 and vacuum thermally insulating material 7 incorporated (interposed) between these fibre-based thermally insulating materials 6.

It is preferred that the region between fibre-based thermally insulating materials 6 and vacuum thermally insulating material 7 be secured with an adhesive agent.

Figure 3:
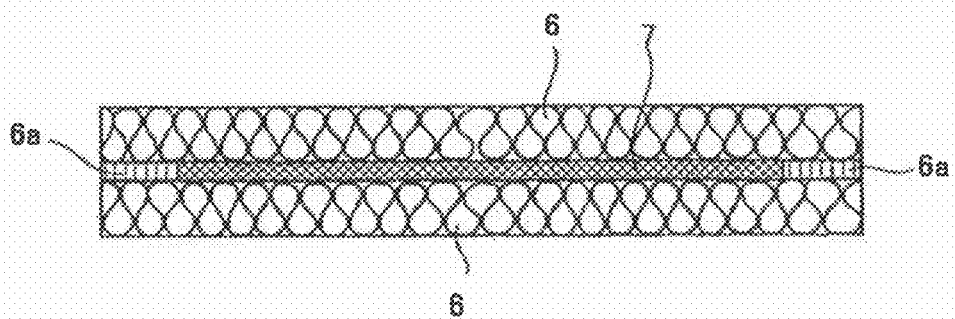
FIG. 3 is a cross-sectional view showing an example where a composite thermally insulating material relating to another embodiment is used.

Furthermore, with regard to the region of juncture 6' between the fibre-based thermally insulating materials 6, this region can be closed-up using the flexibility of fibre-based thermally insulating materials 6 as shown in FIG. 2 but, in the case where the vacuum thermally insulating material 7 is thick and a gap is formed at said juncture 6', the gap region may be filled with thinly-cut fibre-based thermally insulating material 6a as shown in FIG. 3.

The fibre-based thermally insulating material 6 is a thermally insulating material comprising conventionally-used glass wool or the like. On the other hand, the vacuum thermally insulating material 7 is constructed by covering a core material comprising a glass wool moulded material or a rock wool moulded material with an outer covering material comprising a rigid or flexible plastic, nonwoven or paper, etc.

The material from which the core is made is not restricted to the aforesaid glass wool or rock wool, but also includes a material such as an organic fibre, resin powder or ceramic powder, etc, the thickness of which can be maintained.

Furthermore, the density of the vacuum thermally insulating material 7 is appropriately 150-300 kg/m$^3$, and the density of a fibre-based thermally insulating material 6 made of glass wool is 8-100 kg/m$^3$ preferably 10-96 kg/m$^3$, even preferably 10-32 kg/m$^3$, while in the case of a fibre-based thermally insulating material 6 made of rock wool it is appropriately 24-80 kg/m$^3$.

A vacuum or a high level of reduced pressure in the core region is secured either by producing the vacuum thermally insulating material 7 under reduced pressure or by lowering the pressure following moulding. A vacuum thermally insulating material 7 of this construction is characterized in that its thermal conductivity is about 1/5th to 1/20th lower when compared to a fibre-based thermally insulating material 6.

In one illustrative embodiment, a composite insulation was made up of 100 mm of glass wool with a density 24 kg/m$^3$ (four 25 mm layers) enclosing in the middle a vacuum insulation material such that the total density is about 34 kg/m$^3$. The thermal resistance measured according to JIS A1412-2 with a heat flow meter apparatus was 4.7 m$^2$·K/W, corresponding to a thermal conductivity of 0.021 W/m·K, whereas the thermal resistance of the same thickness of glass wool only with a density 24 kg/m$^3$ is 2.85 m$^2$·K/W, corresponding to a thermal conductivity of 0.035 W/m·K. The composite of the invention thus provides excellent thermal performance.

By providing at least a fixed density difference (for instance at least 30 or 50 kg/m$^3$) between the fibre-based thermally insulating material 6 and the vacuum thermally insulating material 7, when pressed from the outside or when bent it is possible to a certain degree to ascertain the position of the inner vacuum thermally insulating material 7 which cannot be seen from the outside, so trimming is possible.

Figure 4:
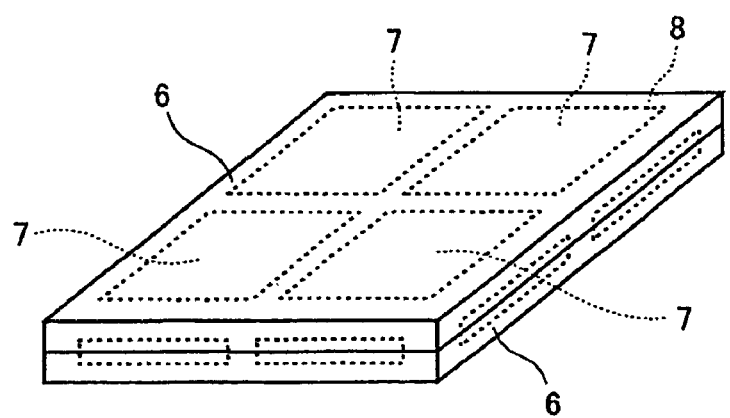
FIG. 4 is a perspective view of the composite thermally insulating material of the present invention formed to make "sizing" possible.
Figure 5:
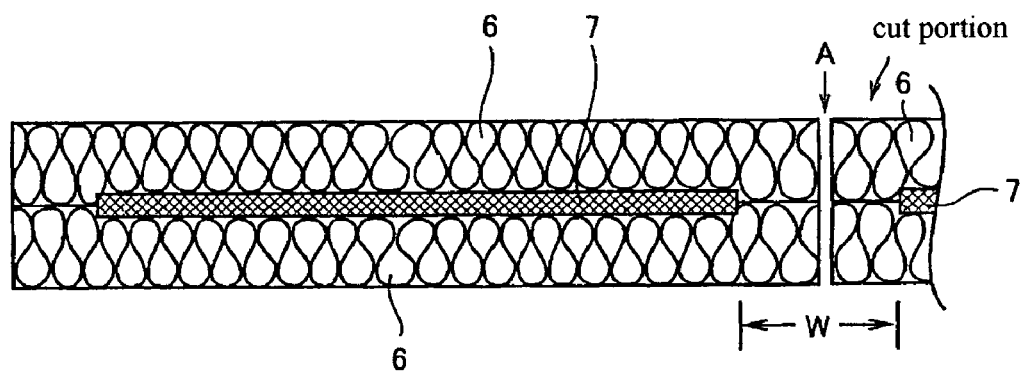
FIG. 5 is a partial sectional view showing the "sized" state of the composite thermally insulating material of the present invention formed to make "sizing" possible

FIGS. 4 and 5 show further embodiments, of which FIG. 4 is a perspective view of the composite thermally insulating material of the present invention formed to make "sizing" possible; and FIG. 5 is a partial sectional view showing the "sized' state of this composite thermally insulating material of the present invention formed to make "sizing" possible.

In FIG. 4, four sheets of vacuum thermally insulating material 7 are packed by means of fibre-based thermally insulating materials 6. Lines 8 corresponding to the outer edges of each of these vacuum thermally insulating materials 7 are drawn on the surface of the fibre-based thermally insulating materials 6. The space W between these lines 8 is the region where cutting is possible at the time of "sizing". When cavities in walls or ceilings, etc, are filled using the composite thermally insulating material of the present invention formed in this way, by carrying out the "sizing" in the regions of space W it is possible to perform fitting to match the wall width, etc, without damage to the vacuum thermally insulating material 7. FIG. 5 shows an example where "sizing" has been carried out in space W (at the region arrowed A).

In FIG. 4, there is illustrated an example where four sheets of vacuum thermally insulating material 7 are packed but the interposed vacuum thermally insulating material 7 may also be a single sheet. In such circumstances, the location of cutting is the composite thermally insulating material edge regions.

In the case the vacuum thermally insulating material is of the type comprising separated vacuum insulating cells, the marking line can correspond to the location of a separation between cells, such as a seal line.

The composite thermally insulating material relating to the present invention can be used as a high performance thermally insulating material for filling restricted cavities between interior and exterior walls.

The invention claimed is:

1. A composite thermally insulating material comprising:
   at least one vacuum thermally insulating material, interposed between at least two sheets of fiber-based thermally insulating materials, wherein an outer shape of the vacuum thermally insulating material is that of a sheet of dimensions smaller than dimensions of an outer shape of each of the at least two sheets, and the at least two sheets are integrally coupled;
   a juncture region situated between facing sides of the at least two sheets of the fiber-based thermally insulating materials, the juncture region located along, and extending outwardly from, an outer peripheral edge of the at least one vacuum thermally insulating material; and
   a thermally insulating interlayer interposed between the at least two sheets of the fiber-based thermally insulating materials along the juncture region,
   wherein the thermally insulating interlayer has a thickness that is substantially the same as a thickness of the at least one vacuum thermally insulating material.

2. The composite thermally insulating material according to claim 1, wherein at a surface of at least one of the fiber-based thermally insulating materials, a pattern is drawn.

3. The composite thermally insulating material according to claim 2, wherein the pattern includes lines that correspond to outer edges of the vacuum thermally insulating material interposed between the at least two sheets of the fiber-based thermally insulating materials.

4. The composite thermally insulating material according to claim 3, wherein the vacuum thermally insulating material is composed of a plurality of independent vacuum insulating cells.

5. The composite thermally insulating material according to claim 2, wherein the vacuum thermally insulating material is composed of a plurality of independent vacuum insulating cells.

6. The composite thermally insulating material according to claim 1, wherein the vacuum thermally insulating material is composed of a plurality of independent vacuum insulating cells.

7. The composite thermally insulating material according to claim 1, wherein the at least one vacuum thermally insulating material includes a core insulating material and an outer covering material.

8. The composite thermally insulating material according to claim 7, wherein the core insulating material is glass wool molded material, rock wool molded material, organic fiber, resin powder, or ceramic powder.

9. The composite thermally insulating material according to claim 7, wherein the outer covering material is rigid or flexible plastic, non-woven material, or paper.

10. The composite thermally insulating material according to claim 1, wherein the thermally insulating interlayer includes a fiber-based thermally insulating material.

* * * * *